United States Patent [19]

Younger

[11] Patent Number: 4,511,159

[45] Date of Patent: Apr. 16, 1985

[54] TRAILER HITCH GUIDE ASSEMBLY

[76] Inventor: Dwen R. Younger, 2181 Lone Oak Ave., Napa, Calif. 94558

[21] Appl. No.: 605,538

[22] Filed: Apr. 30, 1984

[51] Int. Cl.³ .............................................. B62D 53/00
[52] U.S. Cl. ................................ 280/477; 280/478 R; 280/425 R
[58] Field of Search .................... 280/478 R, 477, 466, 280/425

[56] References Cited

U.S. PATENT DOCUMENTS

| | | | |
|---|---|---|---|
| 2,150,010 | 3/1939 | Solomon | 280/491 |
| 2,992,832 | 7/1961 | Robinson | 280/477 |
| 3,159,368 | 12/1964 | Ahlbin et al. | 280/491 |
| 3,201,144 | 8/1965 | Smyser | 280/477 |
| 3,596,925 | 8/1971 | Richie | 280/477 |
| 3,718,317 | 2/1973 | Hilmer | 280/480 |
| 3,767,230 | 10/1973 | DeVries | 280/477 |
| 3,826,517 | 7/1974 | Hunter | 280/511 |
| 3,827,724 | 8/1974 | Ackley | 280/477 |
| 3,900,214 | 8/1975 | Brockelsby | 280/414.1 |

*Primary Examiner*—Joseph F. Peters, Jr.
*Assistant Examiner*—Donn McGiehan
*Attorney, Agent, or Firm*—Townsend and Townsend

[57] ABSTRACT

System for vertically aligning mating members of a tow vehicle and trailer. An elongate guide bar is attached to extend away from the rear of the vehicle, to permit contact of the guide bar with the trailer's jack shaft when the vehicle is backed up to the trailer. A mover system is then attached to the guide bar and used to move the jack shaft along the guide bar, to place the respective mating members in vertical alignment. The mover system is removed, and the jack shaft is lowered to engage the respective now vertically aligned mating members.

18 Claims, 11 Drawing Figures

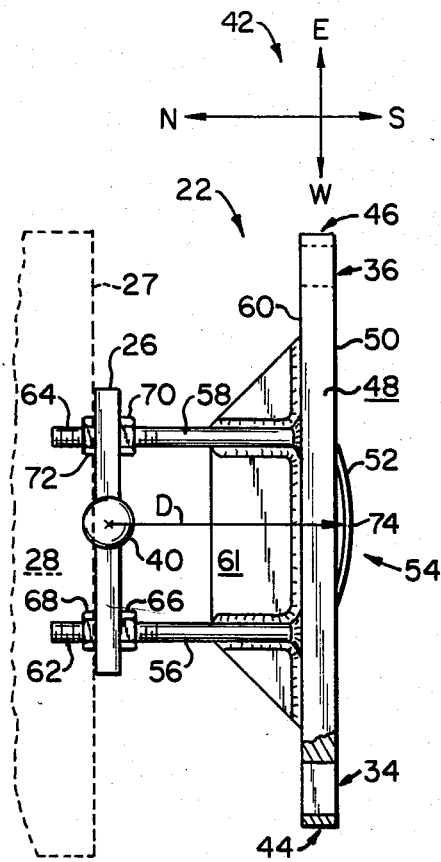
FIG._1A.
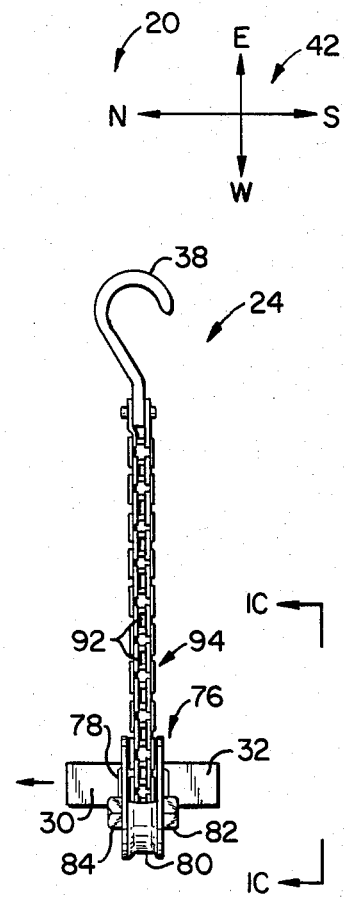
FIG._1B.
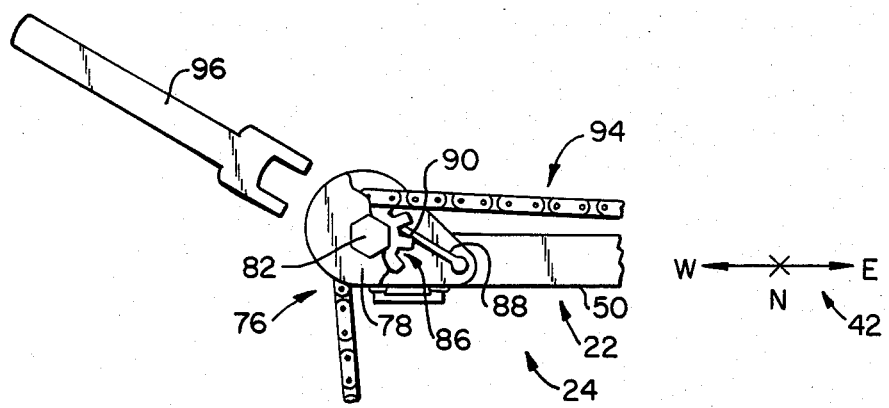
FIG._1C.

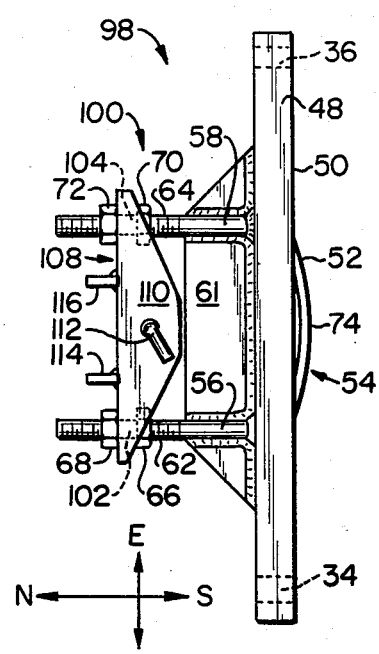
FIG._2A.
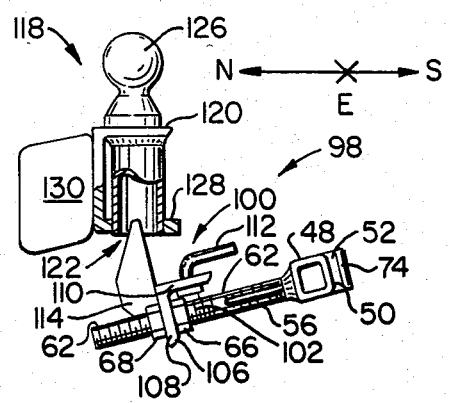
FIG._2B.
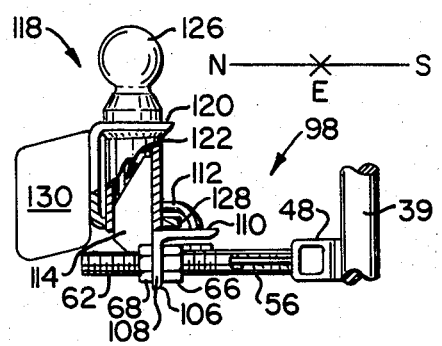
FIG._2C.
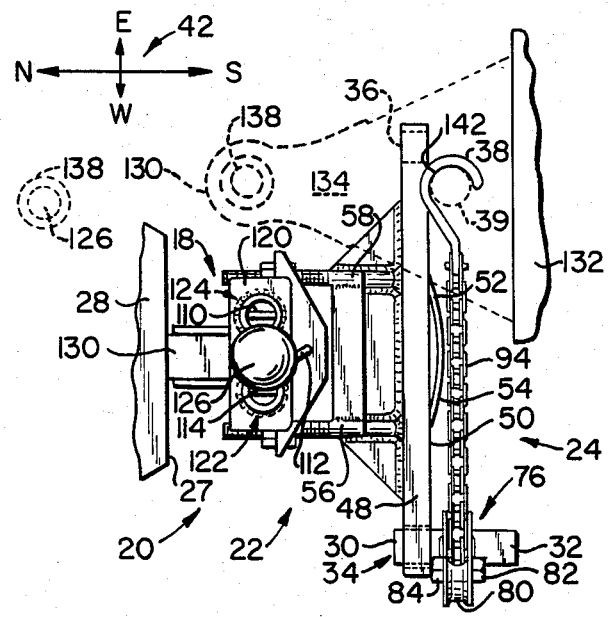
FIG._2D.

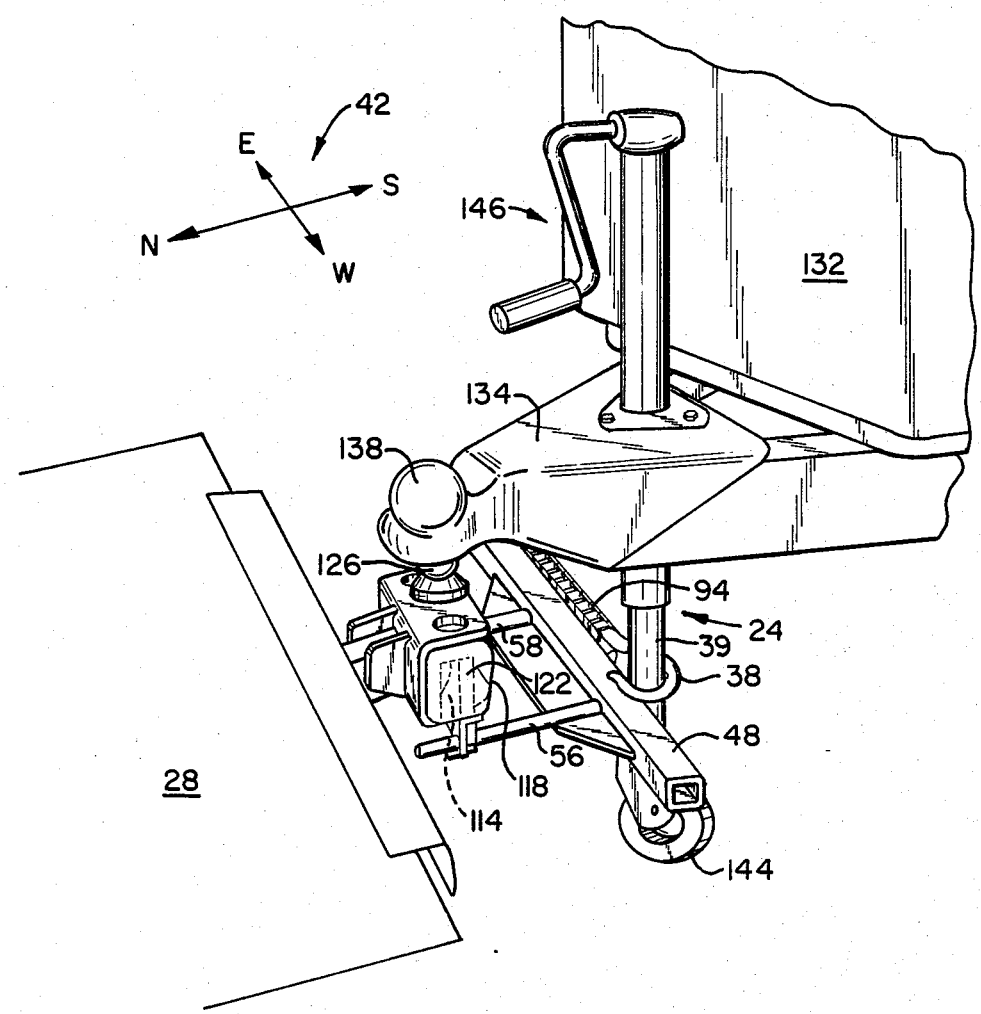
FIG._3.

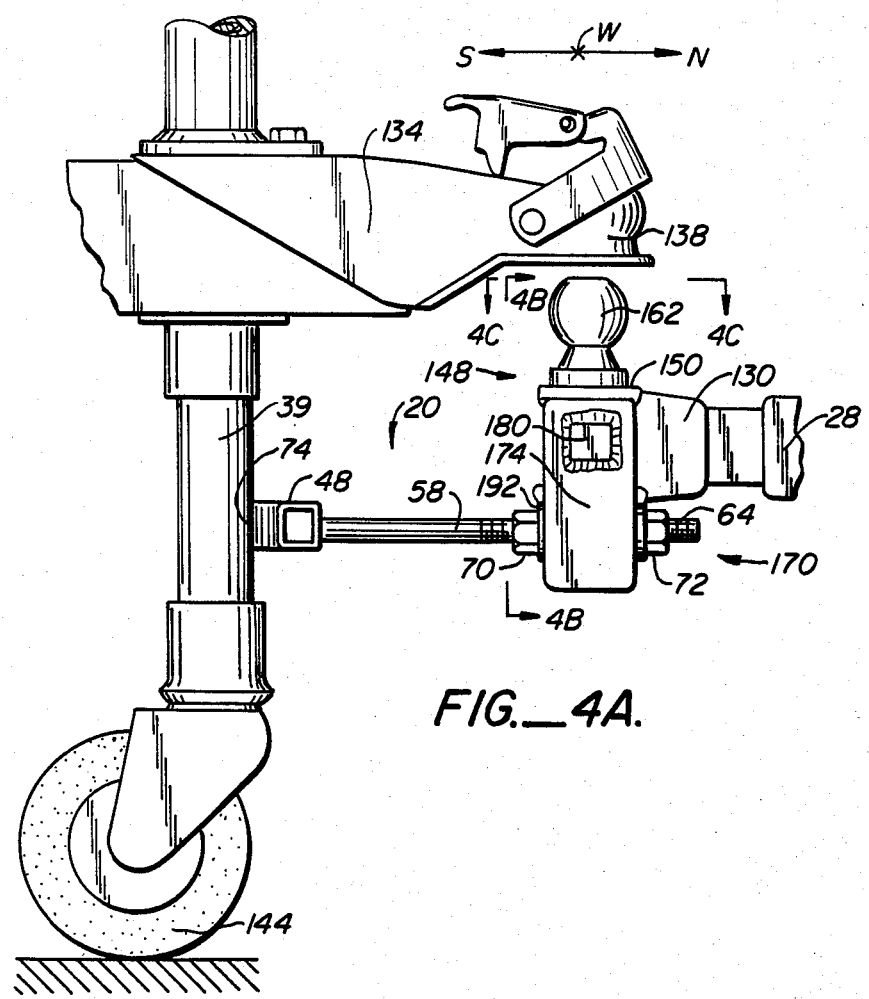
FIG._4A.
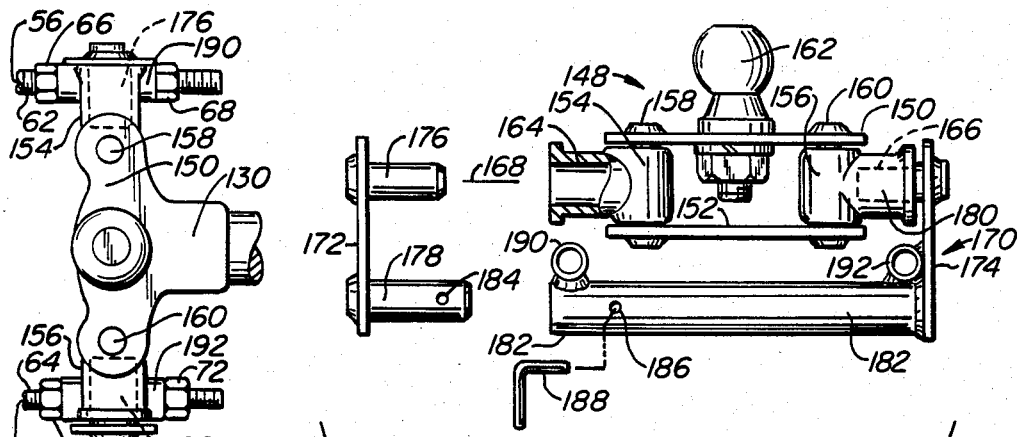
FIG._4C.  FIG._4B.

TRAILER HITCH GUIDE ASSEMBLY

The field of this invention relates generally to systems for connecting tow vehicles and trailers, and more particularly to systems for correctly aligning a towing vehicle with a trailer to be towed so the mating members of each can be easily engaged.

BACKGROUND OF THE INVENTION

It is difficult to correctly position the mating members of conventional tow systems for easy connection.

Conventional tow systems include mating members provided respectively on a towing vehicle and a trailer to be towed. A ball hitch and socket assembly is typical. The ball hitch extends away from the rear of the vehicle, with the ball positioned vertically. The trailer is provided with a protruding mating socket, which fits over and connects to the ball hitch. Often the towing vehicle is a car, and the item towed is a boat or house trailer.

A laborious process is required to properly position the respective mating members for connection. Often two people are involved, one for driving and positioning the tow vehicle with respect to the trailer, and the other for standing near the location of the vehicle and trailer mating members to shout directing commands to the driver. Alternatively, one person can both drive the vehicle plus get out and check the alignment of the mating members, but this is time-consuming.

Both approaches require the driver to successively move the vehicle forward and backward until the mating members are proximate each other. Then the driver, and the other person if present, must physically push, pull and shove the trailer until the trailer mating member is vertically above the tow vehicle mating member.

SUMMARY OF THE INVENTION

This invention provides a system for vertically aligning respective mating members of a towing vehicle and a towed vehicle, which towed vehicle has a jack shaft for raising and lowering the towed vehicle mating member.

The system includes a substantially horizontal elongate guide bar. The guide bar is connected with an attacher which extends away from the rear of the towing vehicle, to permit the guide bar to contact the jack shaft when the towing vehicle is backed up to the towed vehicle, such as a trailer, thus providing the approximately correct positioning of the towing vehicle with respect to the trailer.

This attacher spaces the guide bar away from the towing vehicle mating member at a distance equal, at least at one point, to the distance between the jack shaft and the trailer mating member. When the guide bar is in contact with the jack shaft, a mover system is connected for moving the jack shaft along the guide bar, to place the respective towing vehicle and trailer mating members into correct vertical alignment for proper connection.

This invention offers advantages over previous vehicle-trailer positioning approaches. Only the vehicle driver is needed for properly positioning the vehicle and trailer for hitching. Shouted commands from another person are not required; instead, the vehicle driver looks in rearview mirrors and over the shoulder to correctly place the vehicle and trailer into approximate mating alignment.

Only one backing maneuver is required by the driver to approximately align vehicle and trailer. The driver does not have to use successive approximations of backing up, stopping, getting out of the vehicle to look at the spacing of vehicle and trailer, getting back into the vehicle for moving the vehicle forward and then backward again, and so on until the vehicle and trailer are correctly aligned.

After approximate alignment of the vehicle and trailer is achieved by placing the guide bar against the jack shaft, the driver obtains exact alignment by leaving the vehicle and walking to the location of the mating members. The mover system is mounted and engaged between the guide bar and jack shaft, and operated to move the jack shaft sideways until the trailer mating member is positioned generally vertically above the tow vehicle mating member. The jack shaft is then lowered so the mating members engage for towing, and the positioning system is removed. The entire operation is fast, simple and easy.

BRIEF DESCRIPTION OF THE DRAWINGS

FIG. 1A is a top view of the guide assembly's guide bar and attacher subassembly, oriented with the individual attacher rods parallel to one another with their threaded ends pointing toward the "north" as indicated by the north-east-west-south orientation system;

FIG. 1B is a top view of the guide assembly's mover subassembly, positioned with a respective north and south flanges for insertion into respective slots provided in the each and west end of the guide bar, and including a winch and chain terminating in a hook for connecting around the trailer jack shaft;

FIG. 1C is a side view taken along the line 1C—1C of FIG. 1B, showing a side elevation view of the winch and chain positioned for rotation by a wrench;

FIG. 2A is a top view of the FIG. 1A guide bar-attacher subassembly, specifically adapted for use with an Eaz-Lift TM trailer hitch;

FIGS. 2B and 2C are before-and-after side cutaway views of the guide bar-attacher subassembly adapted for mounting in an Eaz-Lift TM trailer hitch;

FIG. 2D is a top view of the overall guide assembly, showing the guide bar-attacher subassembly adapted for use with an Eaz-Lift TM trailer guide, with the FIG. 1B mover subassembly mounted on the guide bar-attacher subassembly, and the mover hook connected to a trailer jack shaft supporting a trailer;

FIG. 3 is a perspective view of the guide assembly adapted for connection to an Eaz-Lift TM commercially available trailer ball hitch, with the tow vehicle and trailer approaching their final positions to obtain proper alignment of the trailer socket and tow vehicle ball mount;

FIG. 4A is a side elevation view of a Reese TM hitch mounted on the tow vehicle, with the adapter connecting the Reese TM hitch to the inventive trailer guide as the latter contacts the jack shaft of the vehicle to be towed;

FIG. 4B is a rear elevation partially exploded view of the connector adapter taken along line 4B—4B of FIG. 4A with the attacher rods removed for clarity; and FIG. 4C is a top view of the trailer guide taken along line 4C—4C of FIG. 4A with the adapter attached to the Reese TM hitch.

DETAILED DESCRIPTION OF A PREFERRED EMBODIMENT

System Overview

Broadly stated, FIGS. 1A and 1B show the inventive guide assembly 20, which consists of a guide bar-attacher subassembly 22 and a mover system subassembly 24. During use, as seen in FIG. 2A, subassembly 22 is temporarily connected to a receiver 26 which is securely mounted on the rear 27 of a tow vehicle 28. A mover subassembly 24 has flanges 30 and 32 for insertion into slots 34 or 36 of subassembly 22 as required.

A hook 38 provided on mover system 24 connects around the jack shaft 39 of a trailer 132 to be towed (see FIG. 3). Mover subassembly 24 is then operated to move the trailer tow socket 138 into position vertically above a hitch ball or tow ball 126 mounted on tow receiver 26. Finally, jack shaft 39 is operated to lower the socket onto the ball, with the result that vehicle 28 is properly connected to trailer 132 and able to tow it.

Orientation Reference for Drawings

For orientation, all Figures use a coordinate system 42 based on a standard north-east-west-south compass. As shown in FIGS. 1A and 1B, "north" indicates the longitudinal axis of tow vehicle 28 and subassembly 22 when viewed from the top and looking toward the front of the vehicle. Accordingly, left end 44 of subassembly 22 represents "west," the respective right end 46 represents "east," and the trailer is positioned "south" away of tow vehicle 28. In FIG. 1C, "north" points directly into the page and "south" rises vertically away from the page. In FIG. 2B, "east" points directly into the page and "west" rises vertically away from the page.

Description: Apparatus for Eaz-Lift TM Hitch

More particularly stated, the FIG. 1A guide bar-attacher subassembly 22 includes a straight guide bar 48, having both (1) a straight bearing surface 50, and (2) a curved bearing surface 52 provided by an attached curved portion consisting of arc 54. Slots 34 and 36 are provided respectively at west and east ends 44 and 46 of guide bar 48, for receiving respective flanges 30 or 32 of mover subassembly 24 as appropriate, discussed below.

Attacher rods 56 and 58 are welded to a flat north face 60 of bar 48. Rods 56 and 58 are perpendicular to face 60, and parallel to each other. For added rigidity, a plate 61 is welded to both north face 60 and to rods 56, 58. Threaded portions 62 and 64 are provided at the north ends of rods 56 and 58, for accepting nuts 66 and 68, and 70 and 72, to secure rods 56 and 58 to receiver 26. Thus configured, the distance D between the center of hitch ball 40 and apex 74 of arc 54 can be adjusted, permitting subassembly 22 to accommodate differing trailer tow tongue and tow socket geometries.

FIGS. 1B and 1C show respective top and side views of the mover system subassembly 24. A winch 76 is centered on the top surface of flanges 30, 32 and welded in place. Winch 76 includes a housing 78 in which a take-up pulley 80 is rotatably mounted on an axle terminating with hexagonal heads such as those of nuts 82, 84. Pulley 80 has slots 86 for receiving a pawl 88 which is spring loaded to snap into slots 86 as they rotate past pawl 88. Pawl 88 permits pulley 80 to rotate in only one direction when pawl 88 is engaged in a slot 86.

Pulley 80 has protruding teeth 90 for engaging openings 92 of a conventional bicycle chain 94. Chain 94 terminates at its end opposite pulley 80 with a hook 38 for connecting to the trailer to be towed. Nuts 82 and 84 are rotated by a tool such as a wrench 96. This rotation pivots pulley 80, thereby retracting chain 94 and moving hook 38 in a westerly direction toward pulley 80.

FIGS. 2A-2D show one possible configuration and use of guide assembly 20. This FIGS. 2A-2D specific example was fabricated for use with the widely available Eaz-Lift TM trailer hitch attachment. It is to be understood, however, that the FIGS. 1A-1B guide assembly 20 is adaptable for use with other trailer hitches, such as the one manufactured under the name "Reese TM," discussed below.

The FIG. 2A guide assembly 98 is substantially identical to the FIG. 1A guide assembly 22, except that additional details are included in FIG. 2A for a connector 100, which has ports 102, 104 through which rods 56, 58 are connected.

The construction of connector 100 can best be understood with reference to the FIG. 2A top view and FIG. 2B side view. Connector 100 includes an L-channel 106 having one leg 108 positioned perpendicular to rod 56 (and rod 58, not visible in FIG. 2B), and a horizontal leg 110 which is parallel to rods 56 and 58. Respective nuts 56 and 70 are threaded onto respective threaded portions 62 and 64 of rods 56 and 58, before the remainder of each rod is fitted through ports 102 and 104. Then, nuts 68 and 72 are threaded onto rods 56 and 58 and tightened to secure connector 100 in place. A rotatable latch 112 is pivotally connected to horizontal leg 110. Blades 114 and 116 are welded parallel to one another and extend vertically upward from vertical leg 108.

Because this particular configuration of guide assembly 98 is specifically designed for use with an Eaz-Lift TM trailer tow hitch attachment, the Eaz-Lift TM device will be briefly described with reference to FIGS. 2B, 2C and 2D.

The Eaz-Lift TM hitch 118 consists of a housing 120 provided with cylindrical chambers 122 and 124 which penetrate the housing vertically from top to bottom. A conventional tow ball 126 is attached to the top of housing 120, as shown in FIGS. 2B and 2C, and in ghost depiction in FIG. 2D. The Eaz-Lift TM hitch 118 is secured to tow vehicle 28 with a rigid support member 130.

Description: Operation for Eaz-Lift TM Hitch

In use, a two-step procedure is followed to connect the FIG. 2A guide assembly 98 to hitch 118 (see FIGS. 2B and 2C) and mount the mover system subassembly 24 using flange 30 or 32 in the FIG. 2D slot 30 or 36 as appropriate. As shown in FIG. 2B, blade 114 (and the hidden blade 116, visible in FIGS. 2A and 2D) are simultaneously inserted into place through the bottom of visible chamber 122 and hidden chamber 124. As shown in FIG. 2C, after blades 114 and 116 have been fully received by chambers 122 and 124, latch 112 is rotated to rest on a lip 128 of hitch 118.

The next step is for someone to back tow vehicle 28 toward a trailer 132 typically having an outwardly extending tow tongue 134, terminating in its forward tip 136 with a tow socket 138 as shown in FIG. 3. Tongue 134 is supported as shown in FIG. 2B by a jack shaft 39, which typically is a threaded member fitted through the tongue for raising and lowering the tongue with respect to the ground. Also, jack shaft 39 typically terminates in a wheel 144 as shown in FIG. 3 for supporting the trailer when the trailer is not connected to a towing vehicle.

FIG. 2D shows one of several desired orientations of vehicle 28 with respect to jack shaft 39 after the vehicle has been backed up to place bearing surface 50 into contact with shaft 39. The driver leaves the vehicle and walks back to the location of the mating members consisting of ball 126 and socket 138.

It is now time to install the mover system subassembly 24 on guide assembly 98, in order to move tongue 134 toward ball 126 until socket 138 is vertically above ball 126.

For the FIG. 2D position of vehicle 28 with respect to trailer 132, mover system 24 is mounted to the west end of guide bar 48 by sliding flange 30 into slot 34. After connecting hook 38 around jack shaft 39, the operator connects the FIG. 1C wrench 96 to either nut 82 or 84 and rotates pulley 80 in a counter-clockwise direction as viewed from FIG. 1C. This action pulls hook 38 and jack shaft 39 in a westward direction.

Curved segment 52 on guide bar 48, when contacted by trailer jack shaft 39, maintains the required distance between guide bar 48 and socket 138, thus eliminating the necessity for accurately aligning tow vehicle 28 when backing toward the trailer for the "hook-up."

Normally, when making a "hook-up," the trailer parking chocks (not shown) are in place, thereby preventing rearward movement of the trailer, while at the same time maintaining a forward pressure along the length of guide bar 48. This maintains the operating dimensions necessary for completing the coupling of vehicle 28 and trailer 132.

When socket 138 is vertically positioned above ball 126, wrench 96 is disconnected from mover assembly 24 which in turn is detached from guide bar 48. Latch 112 is turned until it faces generally toward the south, thereby releasing connector 100 so the (FIG. 2B) blades 114 and 116 can be removed from ports 122 and 124. The threaded jack shaft 39 is then rotated to lower socket 136 onto ball 126. Thus connected, trailer 132 is now ready for towing by tow vehicle 128.

Threaded rods 56 and 58 are adjusted so ball 126, when in coupling position, is approximately $\frac{3}{8}''$ in back of the coupling position. That is, distance D is about $\frac{3}{8}''$ shorter than the distance from jack shaft 39 to the center of two socket 138. Thus, when socket 138 is lowered onto ball 126, trailer jack shaft 39 is moved back and away from guide bar 48. This allows the guide bar assembly 20 to fall away from unit 130 when clip 112 is released, thus enabling the tow car 28 and trailer 132 to be locked into travelling position before removing guide assembly 20.

Arc 54, as shown in top views of FIGS. 1A, 2A and 2D, is not required for the guide of this invention to work, but arc 54 improves operation of the guide assembly. Rods 56 and 58 are made adjustable so the distance from the center of ball 56 to bearing surfaces 50 and 52 is adjustable, to make this distance the same as the distance between the forward edge 142 of jack shaft of 39 and the center of socket 136.

With arc 54 in mind, and referring again to FIG. 2D, the above procedure will be described in more detail. After vehicle 28 has been backed up so bearing surface 50 of guide bar 48 rests against forward edge 142 of jack shaft 39, mover assembly 24 is mounted on guide bar 48 and connected with hook 38 to jack shaft 39. As winch 76 is rotated to pull jack shaft 39 along bearing surface 50, eventually jack shaft 39 will encounter curved bearing surface 52. Surface 52 pushes jack shaft 39 away (i.e., generally southward) from ball 126, pulling socket 138 with it until socket 138 is positioned vertically above 126.

There is a range of locations along curved bearing surface 52 where jack shaft 39 will be positioned so socket 138 is vertically above ball 126. Absent curved bearing surface 52, there would be only a small range of locations along the entire bearing surface 50 where jack shaft 39 would properly position socket 138 above ball 126. The guide assembly could be manufactured that way, but it is advantageous to include arc 54 to widen the range of acceptable distances of jack shaft 39 for proper positioning of socket 138 with respect to ball 126.

This preferred embodiment constructs the guide assembly to be detachably mountable on a tow vehicle; however, this is not a requirement for proper operation of the guide so long as wheel 144 can be raised above the guide bar. For example, it is probable that the majority of trailer owners own only one trailer. If this is the case, bearing surfaces 50 and 52 will always be at a single desired distance away from ball 126, as determined by the distance between the trailer's jack shaft 39 and socket 138. Using this known distance, rods 56 and 58 can be adjusted to properly space the bearing surfaces 50, 52 from the ball 126.

FIG. 3 shows the tow vehicle and trailer approaching alignment for connection of socket 138 with ball 126. To broaden the discussion, mover system subassembly 24 is shown connected by means of the FIG. 2D flange 32 to slot 36 in the east end of guide bar 48. An Eaz-Lift TM hitch 118 is again used as the holder of ball 126. Shown in cutaway in FIG. 3 are blade 114 and chamber 122, which were previously visible in FIGS. 2A-2D. Wheel 144 at the base of jack shaft 39 provides rolling support for tongue 134 and trailer 132, as jack shaft 39 moves from west to east in FIG. 3. When socket 138 is vertically above ball 126, handle assembly 146 is cranked to lower socket 138 onto ball 126, to connect trailer 132 to tow vehicle 28 for towing.

Description: Apparatus and Operation for Reese TM Hitch

FIGS. 4A-4C show how the inventive trailer guide is configured for use with the commercially available Reese TM trailer hitch. FIGS. 4A-4C show the Reese TM hitch or mount 148; this will be referred to as a "mount" to avoid confusion with the above Eaz-Lift TM "hitch." However, both are trailer hitches.

Mount 148 includes top and bottom rigid plates 150 and 152, between which are sandwiched housings 154 and 156 by means of pivot pins 158 and 160. To top plate 150 is secured an upwardly extending mount ball 162 for receiving trailer socket 138 (FIG. 4A).

Housing 154 and 156 define within themselves hollow horizontal channels 164 and 166. Housings 154 and 156 are pivoted so channels 164 and 166, which are open at their outside ends, lie along a common axis 168 and face in directions opposite from each other.

Adapter assembly 170 consists of two connectable adapter plates 172 and 174, each provided with respective connector legs 176 and 178 (welded to plate 172) and 180 and 182 (welded to plate 174). Leg 182 is a hollow conduit spanning the distance between the openings of channels 164 and 166.

To connect adapter 170 to mount 148, leg 180 is slid into channel 166 until plate 174 contacts housing 156. In construction, (1) channels 164 and 166, and the conduit within leg 182, are square channels, (2) legs 176, 178 and 180 are square legs, (3) legs 176 and 178 are parallel to each other and to plates 150 and 152, and (4) legs 180 and 182 are parallel to each other and plates 150 and 152.

Next, legs 176 and 178 are slid into respective channel 164 and the conduit defined within leg 182. Leg 178 is provided with a hole 184; leg 182 is provided with a matching hole 186 which aligns with hole 184. With legs 176 and 178 in place, a pin 188 is slid into the now aligned holes 184 and 186, to thereby secure adapter 170 to mount 148.

Welded to the opposite ends of leg 182 are tubes 190 and 192, positioned to abut plates 172 and 174. Attacher rods 56 and 58 (omitted in FIG. 4B for clarity) are fitted through and secured to tubes 190 and 192 by nuts 70, 72.

FIG. 4A shows use of guide assembly 20 after connection by adapter 170 to mount 148. As described fully above regarding FIG. 2D, vehicle 28 is backed up until guide bar 48 contacts jack shaft 39. As before, mover assembly 24 is connected to guide bar 48 for winching the jack shaft to move socket 138 to a position above ball 162 for connection.

Claims Define Invention

The above specific embodiments are exemplary of many possible constructions according to the invention. The necessarily narrow examples are provided only to illustrate several modes of assembly and operation of guide assemblies made according to the invention. The actual breadth of the invention is determined by the appended claims.

What is claimed is:

1. An apparatus for vertically aligning respective mating members extending from a towing vehicle and a towed vehicle having a jack shaft, to permit hitching the towed vehicle to the towing vehicle, the apparatus comprising:
   (a) a substantially horizontal elongate guide bar;
   (b) means for attaching the guide bar at a chosen distance from, and at a selected orientation relative to, the vehicle mating member, the distance chosen according to the distance between the jack shaft and the towed vehicle mating member, and the orientation selected so the guide bar confronts the jack shaft when the towing vehicle is backed into contact with the towed vehicle; and
   (c) means for moving the jack shaft along the guide bar to place the respective mating members into vertical alignment.

2. The apparatus of claim 1, wherein at least a portion of the guide bar is a circular arc.

3. The apparatus of claim 1, wherein the attaching means further includes means for varying the chosen distance.

4. The apparatus of claim 1, wherein the attaching means is disposed substantially horizontally and extends perpendicularly away from the rear of the vehicle.

5. The apparatus of claim 1, further including a guide bar having a straight portion on either side of a curved portion.

6. The apparatus of claim 1, wherein the means for moving comprises:
   (a) means for retracting, mountable on the means for attaching the guide bar to the vehicle;
   (b) means for connecting the jack shaft to the retracting means;
   (c) means for rotating the retracting means in a forward rotary direction, which in turn pulls on the connecting means, to move the jack shaft toward the retracting means; and
   (d) means for selectively restraining the movement of the retracting means in a reverse rotary direction.

7. The apparatus of claim 1, wherein the means for moving comprises:
   (a) a winch, mountable on the guide bar, and having a handle for rotating the winch; and
   (b) a chain, connected along its length to the winch and terminating at an outer end with a hook which fits around the jack shaft.

8. An apparatus for vertically aligning respective mating members extending from a towing vehicle and a towed vehicle having a jack shaft, to permit hitching the towed vehicle to the vehicle, wherein the vehicle mating member includes a housing, substantially centered behind the vehicle, having a generally centered and upwardly extending hitching portion for receiving the trailer mating member, on either side of which hitching portion are provided downwardly extending ports which penetrate the housing from top to bottom, the apparatus comprising:
   (a) a substantially horizontal elongate guide bar;
   (b) means for attaching the guide bar to the ports in the housing of the vehicle mating member at a chosen distance from, and at a selected orientation relative to, the vehicle mating member, the distance chosen according to the distance between the jack shaft and the towed vehicle mating member, and the orientation selected so the guide bar confronts the jack shaft when the towing vehicle is backed into contact with the towed vehicle; and
   (c) means for moving the jack shaft along the guide bar to place the respective mating members into vertical alignment.

9. An apparatus for correctly aligning a towed vehicle with a towing vehicle so the towed vehicle can be hitched to the towing vehicle, the towed vehicle having a tow connector and a jack shaft, and the towing vehicle having a tow receiver for receiving the tow connector, the apparatus comprising:
   (a) a rigid attaching bar, extending away from the rear of the vehicle;
   (b) a rigid elongate guiding bar, connected to the attaching bar, aligned to contact the jack shaft when the towing vehicle is backed up to the towed vehicle in preparation for attaching the tow receiver and connector, the attaching bar and the guiding bar together forming an aligning assembly; and
   (c) means for moving the jack shaft along the guiding bar to place the tow connector and tow receiver in vertical alignment, including means for attaching the moving means to the aligning assembly.

10. The apparatus of claim 9, further including means for adjusting the length of the attaching bar.

11. The apparatus of claim 9, wherein the guiding bar is aligned substantially parallel with respect to the rear of the towing vehicle.

12. The apparatus of claim 9, wherein at least a portion of the guiding bar is an arc of a circle having its center generally at the tow connector.

13. The apparatus of claim 9, wherein at least a portion of the guiding bar is an arc of a circle having its center at the tow connector, the radius of which arc equals the distance between the jack shaft and tow connector.

14. The apparatus of claim 9, wherein the guiding bar has a curved portion on either side of which is a straight portion, and wherein the curved portion is an arc of a circle having its center at the tow connector, the radius of which arc equals the distance between the jack shaft and tow connector.

15. The apparatus of claim 9, wherein the means for moving comprises a winch to which is attached a means for retracting that terminates in a hook attachable to the jack shaft.

16. The apparatus of claim 9, wherein the means for attaching the moving means to the aligning assembly includes a metal tongue attached to the moving means and slidably mountable in an opening provided in the alignment assembly.

17. A system for aligning a towed vehicle so the towed vehicle can be connected to a towing vehicle, the system comprising:
   (a) a vehicle mating member, extending away from the rear of the towing vehicle;
   (b) a trailer mating member, extending away from the towed vehicle, adapted to connect with the vehicle mating member;
   (c) means for adjusting the vertical distance between the trailer mating member and the ground;
   (d) means for supporting the towed vehicle proximate the trailer mating member;
   (e) a substantially horizontal elongate guide bar;
   (f) means for attaching the guide bar at a chosen distance from, and at a selected orientation relative to, the vehicle mating member, the distance chosen according to the distance between the jack shaft and the towed vehicle mating member, and the orientation selected so the guide bar confronts the jack shaft when the towing vehicle is backed into contact with the towed vehicle; and
   (g) means for moving the towed vehicle mating member along the guide bar to place the respective mating members in vertical alignment.

18. A system for aligning a towed vehicle so the towed vehicle can be connected to a towing vehicle, the system comprising:
   (a) a vehicle ball mount, extending away from the rear of the towing vehicle;
   (b) a trailer socket, mounted to extend away from the towed vehicle, adapted to connect with the vehicle ball mount;
   (c) a jack shaft, threadably mounted proximate the trailer socket, for adjusting the vertical distance between the trailer socket and the ground;
   (d) a wheel mounted at the base of the jack shaft for supporting the towed vehicle for rolling across the ground;
   (e) a substantially horizontal elongate guide bar;
   (f) means for attaching the guide bar at a chosen distance from, and at a selected orientation relative to, the vehicle ball mount, the distance chosen according to the distance between the jack shaft and the towed vehicle mating member, and the orientation selected so the guide bar confronts the jack shaft when the towing vehicle is backed into contact with the towed vehicle; and
   (g) a winch, mountable on the guide bar, to which is attached a flexible retractable means terminating in a hook adapted to connect to the jack shaft, so when the winch is cranked the hook pulls the trailer socket into vertical alignment with the vehicle ball mount.

* * * * *